C. Kirchhof.
Toy Air Gun.
No. 3,564. Reissued Jul. 27, 1869.
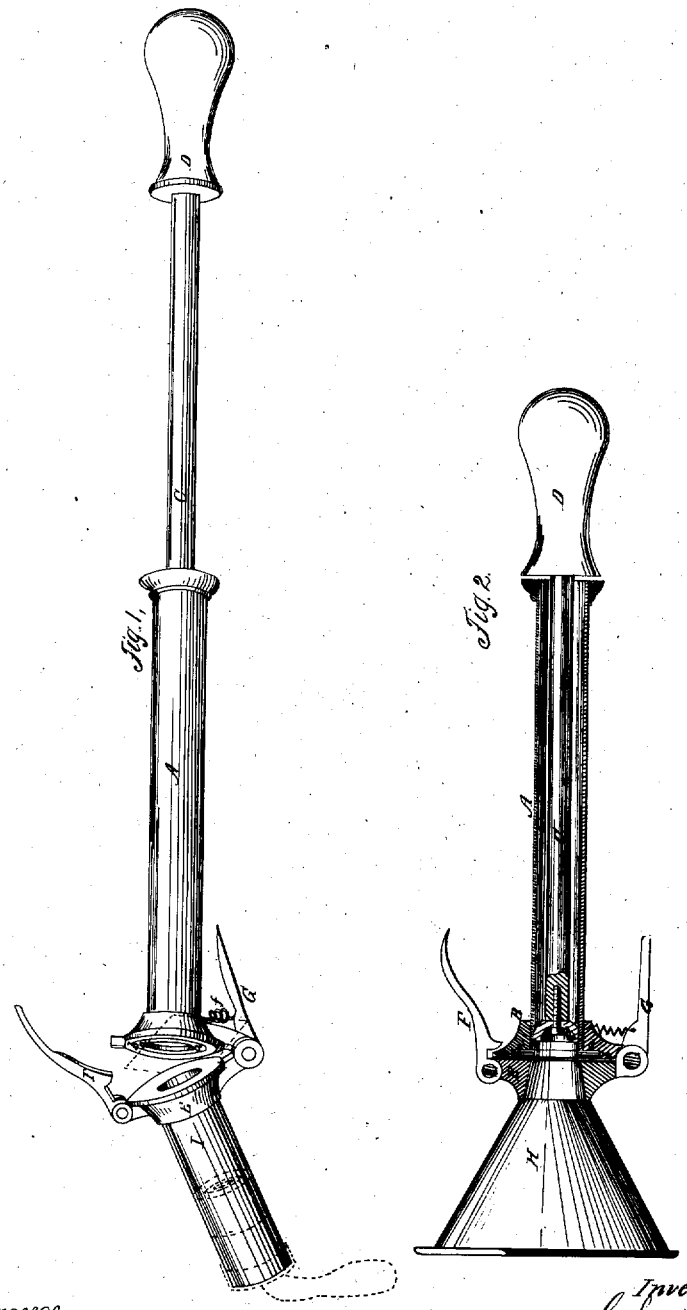
Witnesses.
A. W. Hart
Chas. A. Petit
Inventor.
Chas. Kirchhof
by Munn & Co
Attorneys

UNITED STATES PATENT OFFICE.

CHARLES KIRCHHOF, OF NEWARK, NEW JERSEY.

IMPROVEMENT IN BLAST-GUNS.

Specification forming part of Letters Patent No. 76,925, dated April 21, 1868; Reissue No. 3,569, dated July 27, 1869.

*To all whom it may concern:*

Be it known that I, CHARLES KIRCHHOF, of Newark, Essex county, New Jersey, have invented a new and Improved Blast-Gun; and I do hereby declare that the following is a full, clear, and exact description thereof, which will enable others skilled in the art to make and use the same, reference being had to the accompanying drawings, forming part of this specification, in which—

Figure 1 is a perspective view of my improvement; Fig. 2, a longitudinal sectional elevation of the same.

Similar letters of reference indicate corresponding parts.

This improvement consists, principally, in the combination, with an air-tube or other air-reservoir, of a device for holding paper or other sheet, fabric, or membrane across the outlet of the tube or reservoir in such a manner as to cause the bursting of the paper or other sheet or membrane when the air contained in said tube or reservoir is compressed, thereby producing a sound or signal resembling that of fire-arms.

My improvement further consists in the use, in connection with the air-tube, of other novel devices, which will be hereinafter particularly described.

In carrying out my improvement I provide a barrel or tube, A, made of any suitable material, in which operates, air-tight, in the usual manner, a piston, C, worked by its handle D. The front end of the tube A is provided with an enlargement or collar, B, the face of which contains a recess, *a*, which is filled with a packing-ring, *b*, open in its center, which packing-ring is intended to be so arranged as to project slightly beyond the face of the tube or collar B, so that when a piece of paper or other sheet, membrane, or fabric is pressed upon the packing all escape of air between the outlet of the tube and such sheet or membrane will be prevented. A hinged clamp, E, having a central opening, is pivoted to the collar B, and the said clamp closes upon the face of the packing *b* and collar B in such a manner that when closed, with a piece of paper or other sheet placed between the clamp E and collar B, the said paper or sheet will be firmly held across the outlet of the tube A, and when the piston C is pushed inward the air in front of the piston will be condensed with great force against the surface of the said paper or sheet. When the force applied to push in the piston is sufficient to overceme the inherent strength of the material composing the paper or sheet, the latter will be ruptured with a loud report, due to the sudden expansion of the air when the rupture takes place.

F is a latch, by which the clamp E is locked upon or against the collar B.

G is a finger-bar attached to the clamp E, to facilitate its convenient opening for the insertion of the sheet.

*f* is a spring arranged between the collar B and the finger-piece, which spring serves to keep the clamp E partially closed against the collar B, thereby preventing the accidental loss or falling out of the paper or sheet which is to be used in connection with the instrument.

When it is desired to change or concentrate the sound produced by the rupture of the paper or sheet, I attach a suitably-formed mouthpiece, H, to the clamp E, as shown in Fig. 2.

When it is desired to drive a projectile, I attach to the front of the clamp E an additional barrel, I, in which the projectile is fitted.

When it is desired to inflate an air-tight vessel—such as a bladder or rubber bag—such vessel is to be attached either to the barrel I or to the clamp E, in which case the condensed air issuing from the tube or reservoir will enter such bag or vessel and cause its inflation. The dotted lines, Fig. 1, indicate such a bag attached to the barrel I; also, the projectile within the barrel.

I do not limit or confine myself to the form, size, or constructien of any of the parts herein mentioned, as these may be varied in many ways without departing from my invention; but What I do claim as new, and desire to secure by Letters Patent, is—

1. The combination, with an air-tube or other air-reservoir, of a device for holding paper or other fabric across the outlet of the tube or reservoir, substantially as and for the purpose described.

2. The employment, in combination with the outlet of the air tube or reservoir, of a packing to prevent the escape of air between the paper or sheet and the outlet of the tube or reservoir, substantially as herein described.

3. The employment of the clamp E or its equivalent, in combination with the packing *b* and the tube or reservoir of a blast-gun, substantially as and for the purpose described.

4. The latch F, when hinged to the clamp E and constructed as shown, whereby it is adapted to catch in the rigid notched projection *b* of the collar B, as herein described, for the purpose specified.

5. The finger-piece G, in combination with the clamp E, substantially as and for the purpose described.

6. The employment of a device to hold the clamp in a partially-closed position, to prevent the falling or loss of the sheet, substantially as described.

7. The clamp E of a blast-gun, adapted to receive either the mouth-piece H or barrel I, substantially as described, for the purpose specified.

CHAS. KIRCHHOF.

Witnesses:
A. E. BEACH,
FRANK BLOCKLEY.